No. 657,701. Patented Sept. 11, 1900.
F. J. E. JOHANSSON.
DRIVING MECHANISM FOR CYCLES.
(Application filed Apr. 14, 1900.)

(No Model.)

WITNESSES:
Ella L. Giles

INVENTOR
Frans Johan Emil Johansson
BY
Richards
ATTORNEYS

UNITED STATES PATENT OFFICE.

FRANS JOHAN EMIL JOHANSSON, OF STOCKHOLM, SWEDEN.

DRIVING MECHANISM FOR CYCLES.

SPECIFICATION forming part of Letters Patent No. 657,701, dated September 11, 1900.

Application filed April 14, 1900. Serial No. 12,907. (No model.)

*To all whom it may concern:*

Be it known that I, FRANS JOHAN EMIL JOHANSSON, mechanician, of 12 Karlbergsvägen, Stockholm, Sweden, have invented an Improvement in Driving Mechanism for Cycles, of which the following is a specification.

In some bicycles provided with oscillating treadles the motion is transmitted to the driving-wheel axle through a chain passing from each treadle over a pulley on the said axle and over guide-pulleys across the bicycle to another pulley located on the other end of the axle and provided with a ratchet-coupling, the chain being secured to the latter pulley, all for the purpose of giving an upward motion to the treadles after each depression. The present invention relates to another form of transmission for the same purpose, where, however, the carrying of the chains across the bicycle is dispensed with.

Figure 1:
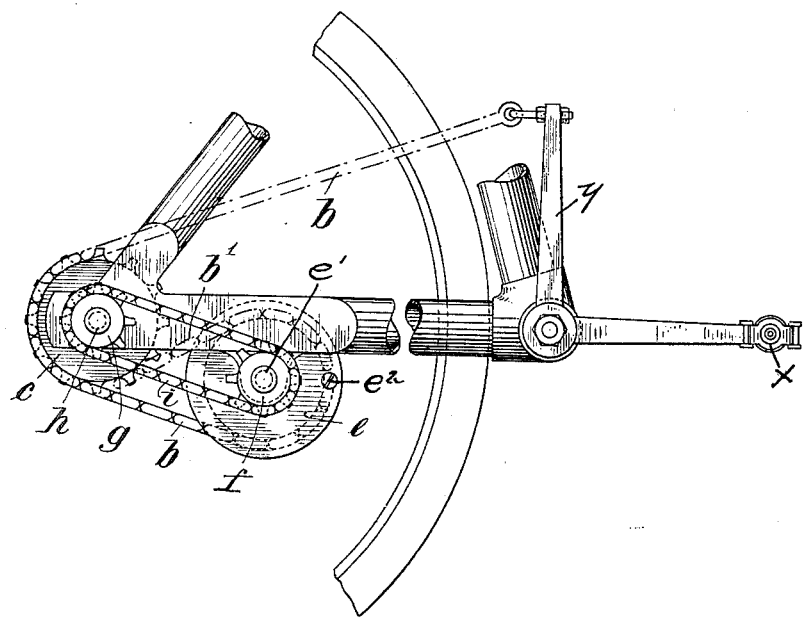
Figure 2:
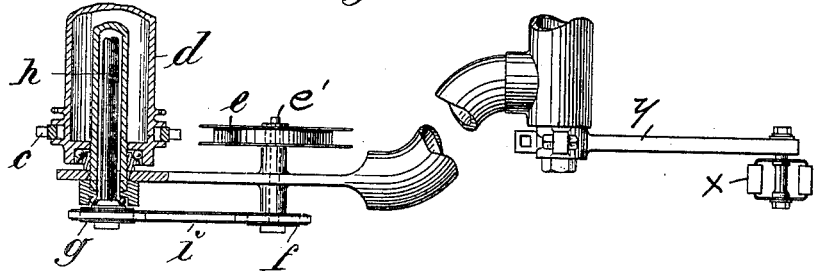

In the accompanying drawings is illustrated in Figure 1 a side view, partially in section, of a portion of a bicycle provided with the transmission device referred to, while Fig. 2 shows the same part viewed from the top, partially in a horizontal section.

The treadles, one of which is shown at $x$, are carried by levers, one of which is shown at $y$. Each of these levers has a chain leading therefrom, and each chain leads over a sprocket-wheel, one of which is shown at $c$, said sprocket-wheels being located at opposite ends of a hollow axle $d$ or hub of the wheel. These sprocket-wheels are connected with the hub $d$ by any suitable ratchet-clutch well known to those skilled in the art, such as in common use, which will allow rotation of the sprocket-wheels backwardly without affecting the hub, but which will drive the hub forwardly when the sprocket-wheels are turned in that direction, an example of which is disclosed in the patent granted to W. B. Turner, No. 465,955. From the sprocket-wheels the chains extend forwardly and about idle wheels or pulleys $e$, which are carried by short pins or shafts $e'$, having bearings in the frame of the machine. Only one of these pulleys and its pin or shaft is shown in the drawings. The chain $b$ is carried under its pulley $e$ and around the same to any suitable point of attachment, the point here shown being indicated by the letter $e^2$, while the opposite chain, corresponding to the chain $b$, is carried over its pulley, corresponding to the pulley $e$, and is attached thereto at any suitable point, similar to the connection of the chain $b$ to the pulley $e$. Each of the shafts or pins $e'$ has attached thereto at its outer end a chain-wheel $f$, and an endless chain $i$ connects each of these chain-wheels with a chain-wheel $g$, located at each end of a shaft $h$, passing through the hollow hub $d$, one of the said chain-wheels $g$ being secured at each end of the shaft $h$. From this construction and arrangement it follows that if the treadle $y$, attached to the chain $b$, is pressed upon and said chain is drawn forwardly it will rotate the sprocket $c$ and through the clutch turn the wheel-hub or drive-shaft. The chain will also turn the pulley $e$ and through the chain $i$ the chain-wheel $g$, the shaft $h$, the chain-wheel $g$ at the opposite end of the shaft $h$, the chain $i$ and the opposite pulley $e$. The chain opposite to the chain $b$ will be drawn upon by reason of it being passed about its pulley $e$ in a direction opposite to the direction in which the chain $b$ passes around its pulley, and this will cause the pedal and lever attached to the said opposite chain to be retracted as the chain $b$ and its pedal are advanced.

I do not wish to limit myself to the arrangement of the chains $b\ b'$ or of the chain $i$, or to this means of connecting the pulleys $f\ g$, as other means and arrangements may be used.

Having now particularly described and ascertained the nature of my said invention and in what manner the same is to be performed, I declare that what I claim is—

In combination in a bicycle, the treadle-levers, the driving-axle, chain-wheels thereon, a shaft $h$ extending through the driving-axle from one side to the other, the wheels $g$ at the ends of the shaft $h$, pulleys $e$ supported on the frame, a wheel $f$ connected with each of the pulleys $e$, flexible connections between the wheels $f$ and $g$, and flexible connections extending from the treadles to the chain-wheels and from the chain-wheels to the pulleys $e$, substantially as described.

In witness whereof I have hereunto set my hand in presence of two witnesses.

FRANS JOHAN EMIL JOHANSSON.

Witnesses:
BIRGER LINOH,
H. TELANDER.